Dec. 20, 1938.　　　　　J. HIRSHSTEIN　　　　　2,140,582
WATER CLARIFYING APPARATUS FOR RECLAIMING OIL AND GREASE
Filed Jan. 21, 1936　　　2 Sheets-Sheet 1

Inventor
JOSEPH HIRSHSTEIN
By Bates, Golrick, & Teare
Attorneys

Dec. 20, 1938.  J. HIRSHSTEIN  2,140,582
WATER CLARIFYING APPARATUS FOR RECLAIMING OIL AND GREASE
Filed Jan. 21, 1936    2 Sheets-Sheet 2

INVENTOR.
JOSEPH HIRSHSTEIN
BY
Bates Golrick & Teare
ATTORNEYS.

Patented Dec. 20, 1938

2,140,582

UNITED STATES PATENT OFFICE 2,140,582

WATER CLARIFYING APPARATUS FOR RECLAIMING OIL AND GREASE

Joseph Hirshstein, Cleveland, Ohio

Application January 21, 1936, Serial No. 60,091

7 Claims. (Cl. 210—56)

This invention relates to apparatus for separating suspended material from waste waters and it has particular application to those waste water clarifying devices which are used to reclaim fatty waste material either carried by or held in suspension in such waters.

In apparatuses of this character, the usual arrangement employed is to maintain a body of water near the surface level of the waste water in a quiescent state, while the water therebelow is moving in the direction of the outlet. As the waste water carries a considerable amount of sediment and other debris, these heavier particles fall into the lower region of the stream and are carried rapidly to the outlet. It has occurred in the past that at intervals when the waste water carried any excess of this heavy material, the outlet has frequently been insufficient to accommodate the passage of this material and clogging of the trap has resulted.

I have remedied this condition in my present invention by retarding the flow of waste material to the outlet end of the clarifying apparatus at any one time. It is therefore an object of my present invention to prevent the clogging of the discharge end of the separating device when excess waste material is suspended in the water.

It is a further object of my invention to control the amount of heavy waste material suspended in the water, that may be carried to the discharge end of the device at any particular interval.

A still further object of the invention is the provision of a grease and oil trap construction of the continuous flow type which will be more efficient in its functions than devices of the same general type heretofore commercially exploited and which will be simple and economical in manufacture and in its installation requirements.

Figure 1:
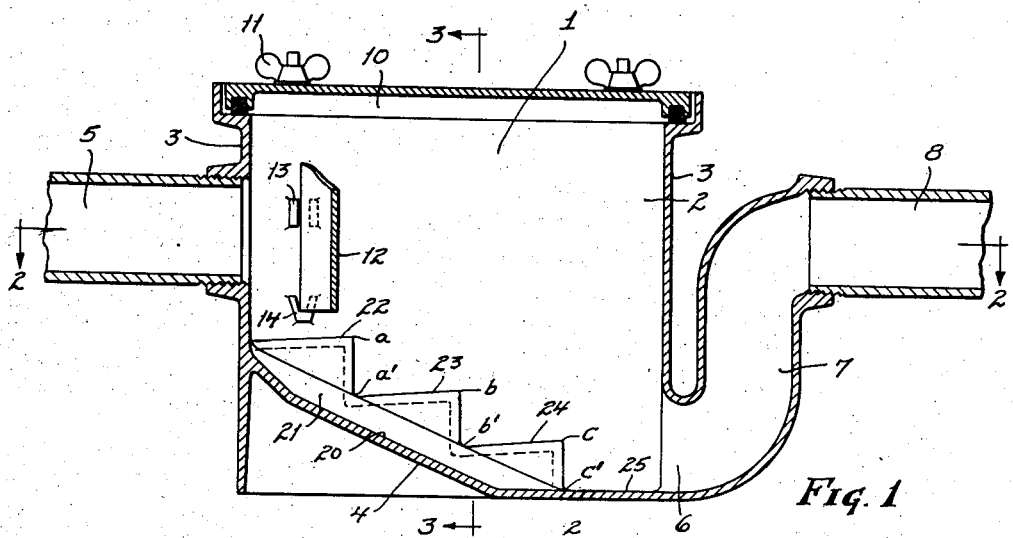
Figure 2:
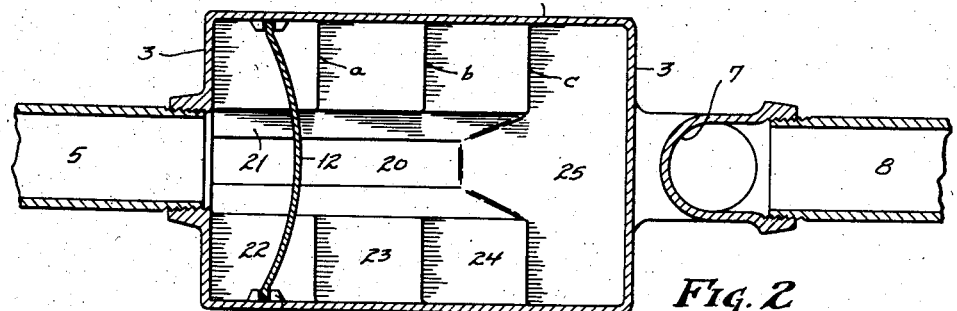
Figures 3, 4:
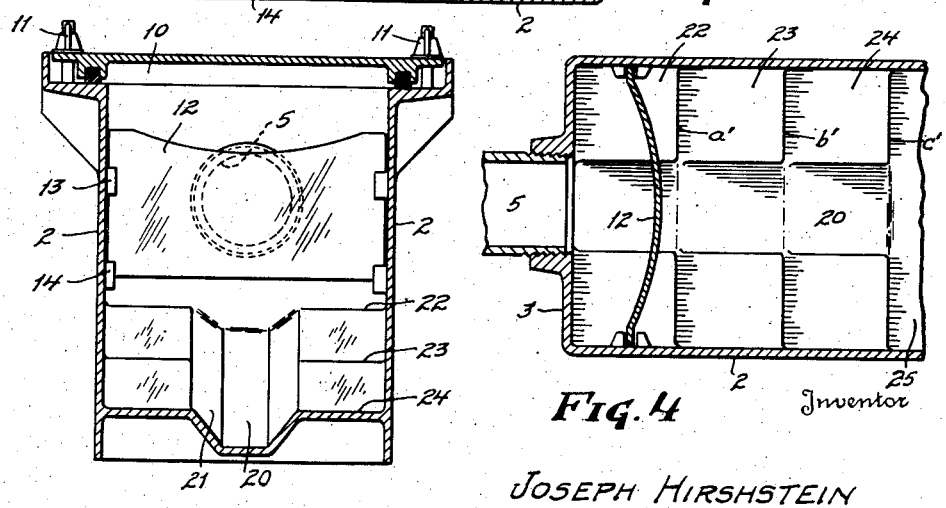
Figure 6:
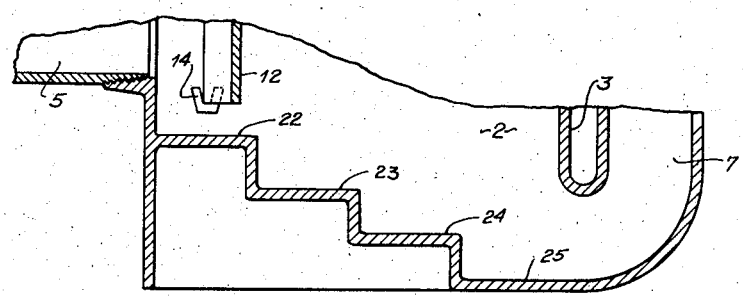
Figure 7:
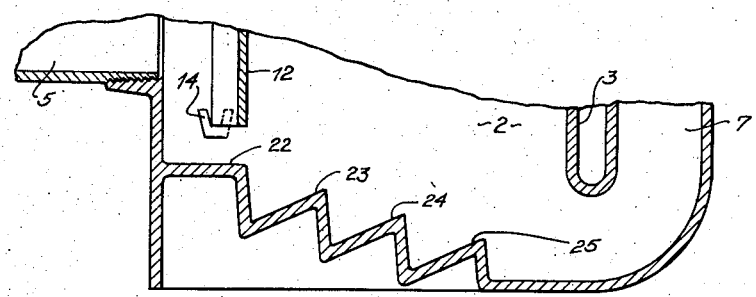
Figure 5:
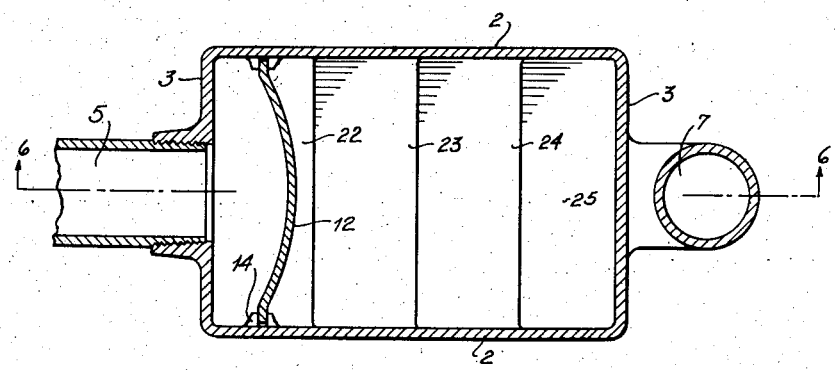

Further and more specific objects of my invention will appear from the description given in connection with accompanying drawings wherein:

Fig. 1 shows a centrally located vertical section of a clarifying apparatus embodying my invention; Fig. 2 is a horizontal section taken along the line 2—2 in Fig. 1; Fig. 3 is a vertical section, taken along the line 3—3 in Fig. 1; and Fig. 4 is a fragmentary horizontal section of the same device, illustrating another form of my invention; Fig. 5 is another modified form of my invention; Fig. 6 is a sectional view taken along the line 6—6 in Fig. 5; and Fig. 7 is a fragmentary sectional view of another arrangement of the steps, as shown in Fig. 1 or Fig. 5.

Referring now to Fig. 1, I have shown a clarifying apparatus comprising a basin 1 having side walls 2, end walls 3, and a bottom 4. An inlet pipe 5 is located near the top of the basin 2. A discharge opening 6 of substantially the same cross-sectional area is provided at the bottom of the basin 2. A vertical passageway 7 communicates with the discharge opening 6, and extends the exit passageway to the same level as the inlet 5, and at this point connects to the sewer through the discharge pipe 8. By maintaining the inlet 5 and the discharge 8 at the same level, a water seal is thus formed so that the sewer gases may not return from the pipe 8 back to the inlet 5. A cover plate 10 is secured to the compartment 2 by suitable fastening means 11 to prevent the escape of objectionable odors, and suitable packing material may be used to seal the cover tightly to the basin 1.

To maintain a quiescent condition near the water level in the basin 1, a baffle plate 12 is secured to the side walls 2 by means of small lugs 13 and 14, so that the bottom edge thereof is slightly below the level of the water at the inlet 5. It is desirable to use a form of baffle plate, such as I have illustrated in Fig. 2, wherein a radius of curvature is applied to the plate so that the water flowing from the inlet 5 will be distributed uniformly across the back portion of the compartment 2. While this construction is desirable, any other type of baffle which has the tendency to distribute the water in this manner will be capable of carrying out my invention.

In operation, the waste water containing suspended particles of fatty material, and heavier matter such as debris, flow into basin 1 through the inlet opening 5, striking the baffle plate 12. This water is distributed uniformly over the back portion of the basin. To pass the baffle 12 the water is diverted downwardly against the bottom wall 4 of the basin which is inclined in the direction of the discharge opening. The water in contact therewith will receive a certain amount of agitation. The water on the upper level of the liquid in the basin, however, will be in a quiescent state as it lies behind the baffle plate 12, and is not disturbed by the undercurrent of the water moving in the direction of the outlet 6.

The agitation produced by the flow of water over the bottom floor of the basin increases its retensive properties for carrying along the heavier bits of debris which are suspended therein. These small objects are carried by the water in proportion to the volume of discharge to the outlet 6, where they are forced up to the discharge pipe 8. This action is partly due to the flow of water, as well as the syphonic effect created by the rush of water into the discharge pipe 8. If sufficient material is contained in the water at any particular interval, the force of the discharge will not be sufficient to carry it away. A clogging of the outlet opening 6 will therefore result and the apparatus will be temporarily inoperative until normal conditions are again resumed.

To remedy this condition, I have provided means whereby the heavier particles of debris contained in the waste water may be retarded and delayed before entering the discharge opening 6. This improvement consists of a series of cascades disposed upon the sloping bottom wall 4, as illustrated in Fig. 1 of the drawings. The central channel way 20, having sloped sides 21, allows the passage of water from the inlet 5 to the outlet 6, without any substantial interference. The remaining portions of the sloping bottom 4, however, are provided with a series of steps or cascades indicated at 22, 23, and 24. The water that is therefore distributed by the baffle plate 12 to the step 22 will be agitated by the edges of such steps, as at a, b and c, respectively. At a point vertically downward from the cascades a zone of quiescent state is established. These points are indicated as a', b', and c'. It may thus be seen that the portion of the water falling over the edges of cascades a, b, c, will circulate until it reaches the quiescent zone a, b, and c, and drop any waste material that it contains upon the surfaces formed by the steps 23, 24 and 25.

The step 22 will not receive much of this waste material as the water is constantly being diverted downwardly upon the surface thereof by the baffle plate 12. The remaining cascade steps, however, will collect a considerable amount of this material and due to the agitation of the water it will gradually have the effect of working its way back from the outer edge of the steps to the quiescent zones indicated by the points a', b', and c'.

The heavier material thus collected at the bottoms of the respective cascades will gradually accumulate until there is sufficient amount to cause the same to fall over the edge of the steps 23 and 24 into the main stream 20. It may thus be seen that during a period when the waste water contains a great amount of these heavier substances, such material will be retarded in its flow to the outlet 6. At a later period, when the water does not contain a large amount of suspended substances, these waste materials will gradually find their way into the main stream and into the outlet. The rush of suspended material to the outlet at any particular time is therefore avoided and clogging of the discharge end of the grease collecting basin is thereby obviated.

To enhance the retarding action of a series of cascades and to control the retardation of heavy particles suspended in the water, I have utilized certain arrangements as illustrated in the drawings. Figs. 1 and 2 show one form of my invention, illustrating a certain type of retarding action, which may be derived from the cascade system. Fig. 4 shows other forms of my invention where the cascade action is varied in proportion to the flow of the main stream whereby the retarding action of the device may be regulated in accordance with prevailing conditions of the waste water discharge to which it is attached.

In the arrangement shown in Figs. 1 and 2, I have found that by slightly rounding or filleting the bottom portions of the cascades, a', b' and c' the tendency for the material to roll over the edge of the step and into the main stream after a sufficient amount has accumulated, is increased. The upper edges of the steps a, b, and c form sharp right angles in comparison to the respective points a', b' and c'. The tendency therefore is that the water will be agitated as it runs over the sharp edges of the cascades, while at a point directly below a pocket is formed in which the water and particles may remain in a quiescent state. Thus, the suspended material in the water which has been agitated by the sharp edges, a, b, and c will gradually deposit on the steps 23, 24 and the surface 25, and finally seek its way back into the zone of quiet represented by a', b', and c'.

In constructing the steps 23 and 24, I have found that by slightly lowering the elevation of the point a' with respect to the point b and the point b' with respect to the point c, that the material deposited on the steps 23 and 24 will work its way back into the quiet zone a' and b' with greater facility. The tendency is that the particles will gradually slide down the slope provided on the cascade steps 23 and 24. I have only constructed the cascade steps 23 and 24 in this manner, as I find that it is sufficient for most purposes to control the amount of material deposited thereon. If the necessity demands I may increase the number of the steps and also increase the slope of the surface thereof as shown in Fig. 7 and thereby control the amount of material which will be deposited at any particular interval, should the waste water carry an excessive amount.

In combination with the cascade steps shown in Figs. 1 and 2, I have constructed the main stream 20, so that the particles leaving the surface of the steps will gradually find their way into the faster currents at the center of the stream. To this extent, I slope the sides of the stream as illustrated in Figs. 2 and 3 by the reference numeral 21. The heavier material falling over the edges of the steps at the points a' and b' will gradually reach the center of the stream by rolling down the slope 21 on the sides of the channel. It may thus be seen that a gradual retardation of these particles is formed by the various combination of arrangements of the cascade steps and the central channel. It may also be seen that I may vary the proportion of the cascade with relation to the central channel or the amount of slope of each, and thereby either increase the retardation or decrease the same, depending upon the conditions of the water to be passed through the clarifying apparatus.

In Fig. 4 of the drawings, I have illustrated another form of my invention for retarding the heavier waste particles. In that construction I have left the surfaces of the steps 23 and 24 in a substantially level plane. The particles of material will gradually find their way to the quiet zones at points a', b' and c' in the same manner as in the former construction. In place of the sloping sided channel, I have provided one with a flat bottom 20. The small particles of material accumulated on the steps in the quiet zones a', b' and c' will thus find their way into the main stream immediately upon dropping from the edges of the steps. If the conditions demand I may eliminate the main stream entirely and continue the steps across the width of the basin as illustrated in Figs. 5 and 6. This will substantially increase the amount of material retarded but the only provision for its removal is the re-suspension of the particles during a period when the waste waters are free from this material and will readily pick up extra material. In the arrangements just described, I may vary the proportions or the number of steps to suit the conditions of the waste water to be clarified. If I find that the steps when disposed on a level surface will not hold sufficient material, I may then slope the surface of the step toward the foot of each cascade and thereby increase its capacity to hold and collect waste particles, as illustrated in Fig. 7. My invention, therefore, is not confined to the particular constructions shown as I may vary the number of steps and the size or the character of the main stream with relation to the steps or cascades to suit the particular conditions of flow. Some waste materials may carry larger particles than others, and in this case one arrangement may be suitable, while in the case of smaller particles, other arrangements may be more efficient.

I am aware of grease trap constructions wherein slanting bottoms of the trap bodies are provided with relatively low ribs which converge toward the center of the sloping bottom of the trap for the purpose of directing excess of solids toward the trap outlet. However my present construction embodies a bottom construction which tends to slow up the acceleration flow of the lower portion of the body of liquid in the trap thereby affording a sufficient time interval for the excess of solids to be deposited upon the cascade shelves from which it may be removed gradually by waste water discharges which are not unduly burdened with solids.

It will thus be seen that I have invented a new improvement in apparatuses for clarifying water, whereby I may retard the action of these particles suspended in the waste material and discharge them to the outlet openings at the proper time.

I claim:

1. In a clarifying apparatus for waste waters, a basin having an inlet and an outlet, a sloping channel in the bottom wall of said basin for directing the flow of water from the inlet to the outlet, and a plurality of level surfaces arranged at different elevations lying adjacent said bottom channel, for collecting deposits of waste material thereon.

2. In a clarifying apparatus for waste waters, a basin having an inlet and an outlet, a main channel disposed within the bottom wall of said basin for directing the flow of water from the inlet to the outlet, a plurality of tributary channels arranged at different elevations along the channel, to form recesses for the collection of particles and retard their movement to the outlet, one end of each tributary channel communicating with the main channel at substantially right angles to the flow of water therein.

3. In a clarifying apparatus for waste water, a basin having an inlet and an outlet, a bottom therefor, a channel for directing the flow of water from the inlet to the outlet, a plurality of square-edged obstructions projecting upwardly from the bottom of said basin lying adjacent the channel, to agitate the flow of water, the edge of each obstruction being substantially at right angles to the flow of water in the channel, and there being secondary channels formed between successive obstructions to collect waste particles and retard their movement to the outlet.

4. In a clarifying apparatus for waste waters, a basin having an inlet and an outlet, a bottom wall in said basin sloping in the direction of the outlet and a plurality of level surfaces arranged at different elevations on said bottom wall for collecting deposits of waste material thereon, and to retard their movement to the outlet while permitting agitation of the particles above said surfaces.

5. A water clarifying apparatus for collecting waste material having a basin with an inlet and an outlet, a bottom therefor, and a series of sharp-edged obstructions forming a saw tooth configuration projecting upwardly from the bottom of said basin and extending across the width thereof to agitate the water and provide recesses for the retardation of waste particles, the edge of each obstruction being substantially at right angles to the flow of water from the inlet to the outlet.

6. In a clarifying apparatus for waste waters, a basin having an inlet and an outlet, a channel in the bottom wall thereof for directing the flow of water from the inlet to the outlet, and a series of sharp-edged obstructions having alternate recesses therebetween disposed on the remaining portion of the bottom wall lying adjacent the channel, to agitate the water and provide means for the collection and retardation of waste particles, the edge of each recess being at substantially right angles to the flow of water in the channel.

7. A water clarifying apparatus for collecting waste material, having a basin with an inlet and an outlet, a sloping bottom therefor, and a series of steps extending across the width of said bottom in a direction substantially normal to the direction of the flow of water from the inlet to the outlet, whereby a cascade action is produced at the edge of each step, and the surface of each step having a rearward slope to form a recess with each preceding step for collecting waste material thereon and to retard the movement of such material to the outlet.

JOSEPH HIRSHSTEIN.